W. F. BROWNE.
Gridiron.
No. 92,008.    Patented June 29, 1869.
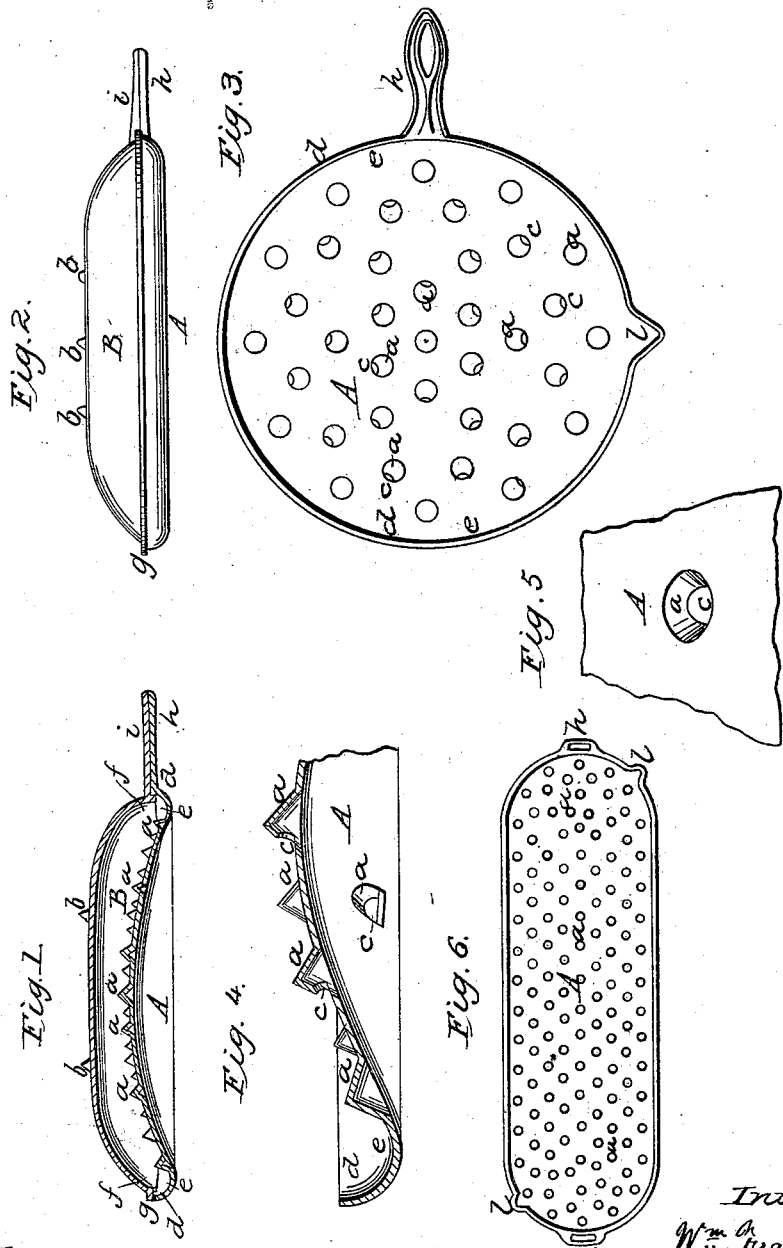

United States Patent Office.

WILLIAM FRANK BROWNE, OF NEW YORK, N. Y.

Letters Patent No. 92,008, dated June 29, 1869.

BROILER.

The Schedule referred to in these Letters Patent and making part of the same.

*To all whom it may concern:*

Be it known that I, WILLIAM FRANK BROWNE, of the city, county, and State of New York, have invented an Improved Meat-Broiler; and I do hereby declare that the following is a full and exact description thereof, reference being had to the accompanying drawings, making part of this specification—

Figure 1 being a central vertical section of the broiler, and of its cover in portion.

Figure 2, a side view of the same.

Figure 3, a top view of the broiler, without the cover.

Figure 4, a central vertical section of a part of the broiler, on an enlarged scale.

Figure 5, bottom view of a portion of the broiler, on an enlarged scale.

Figure 6, a top view of a modified form of the broiler.

Like letters designate corresponding parts in all of the figures.

I make the broiler A quite convex in the middle, as indicated, and gradually sloping away toward the edge, into a channel, e, outside of which the edge curves upward more abruptly, into a rim, d.

Thus all the juices of the meat flow out into the single channel e, from which they are poured by a spout, l, after the broiling is completed. And yet there is no corner nor portion of the surface which cannot be easily reached for cleaning.

The convex form not only serves to shed the juices from the surface into the channel e, but also to concentrate the heat under the broiler, and to allow the heated air to circulate beneath the whole broiling-surface, even though it may project beyond the opening in the top of a stove or furnace.

The general surface of the broiler is smooth; but it is studded with quite numerous upward projections a a, of conical, or approximate form, terminating in points nearly sharp, at the apex.

These conical projections are of nearly or quite uniform height, and support the meat thereon, so that very little of the surface of the meat comes in contact with the metal of the broiler, a desideratum of obvious advantage. Yet these conical points, in themselves, do not form the distinctive feature of my invention, in this part of the construction. But at the base of each conical point, (which is hollow, or has about the same thickness of metal as the surrounding plate of metal,) a lateral aperture, c, is formed through the metal, to admit a free passage of heated air through the boiler, so as to circulate in immediate contact with the meat, the cones keeping the metal raised above the general surface of the broiler, in order to allow such circulation.

These lateral apertures are all situated at the lower side of the cones, so that the juices will flow down the surface of the broiler, without dropping through and wasting.

The lower cones, next to the channel e, should have no apertures, in order that the juices may collect in the channel without wasting.

The form of broiler shown in figs. 1, 2, and 3, is round; but it may be of an oblong form, as shown in fig. 6, which is capable of the same convex construction, and surrounding channel and rim, as described, in the round form.

In this form, it is convenient to have two pouring-out spouts, l l, on opposite sides, so that no choice may be required as to the side of the broiler to be held adjacent.

The round form has a single projecting handle, h, and the oblong form, two short handles, as shown.

For a cover to the broiler, I make a tight vessel, B, of proper form to serve as a vessel for cooking-purposes of itself, substantially as represented.

And in order to adapt it for separate uses, it has suitable legs, or lugs b b upon its outer surface, to support it upright, when used with its hollow side upward.

Its extreme edge f may fit just inside of the edge of the broiler-rim d, and it may have a narrow flange, g, projecting outward, to rest on the edge of said broiler-rim.

The cover has a handle, i, of a size and shape corresponding with that of the broiler, as indicated in the drawings, so that the two may be held together, in lifting the broiler.

The broiler and cover are both ordinarily made of cast-iron, but they may be formed by dies from sheet-iron.

What I claim as my invention, and desire to secure by Letters Patent, is—

1. A broiler having the form, and provided with the conical projections a a, with lateral apertures at their base, substantially as and for the purposes herein specified.

2. Also, a broiler-cover, B, so formed as to serve the double purpose of a close cover for the broiler and a separate cooking-utensil, substantially as herein set forth.

Witnesses:   WM. FRANK BROWNE.
  J. S. BROWN,
  R. D. O. SMITH.